Jan. 19, 1937.  C. E. STARR  2,068,437
AUXILIARY TRANSMISSION
Filed March 14, 1935
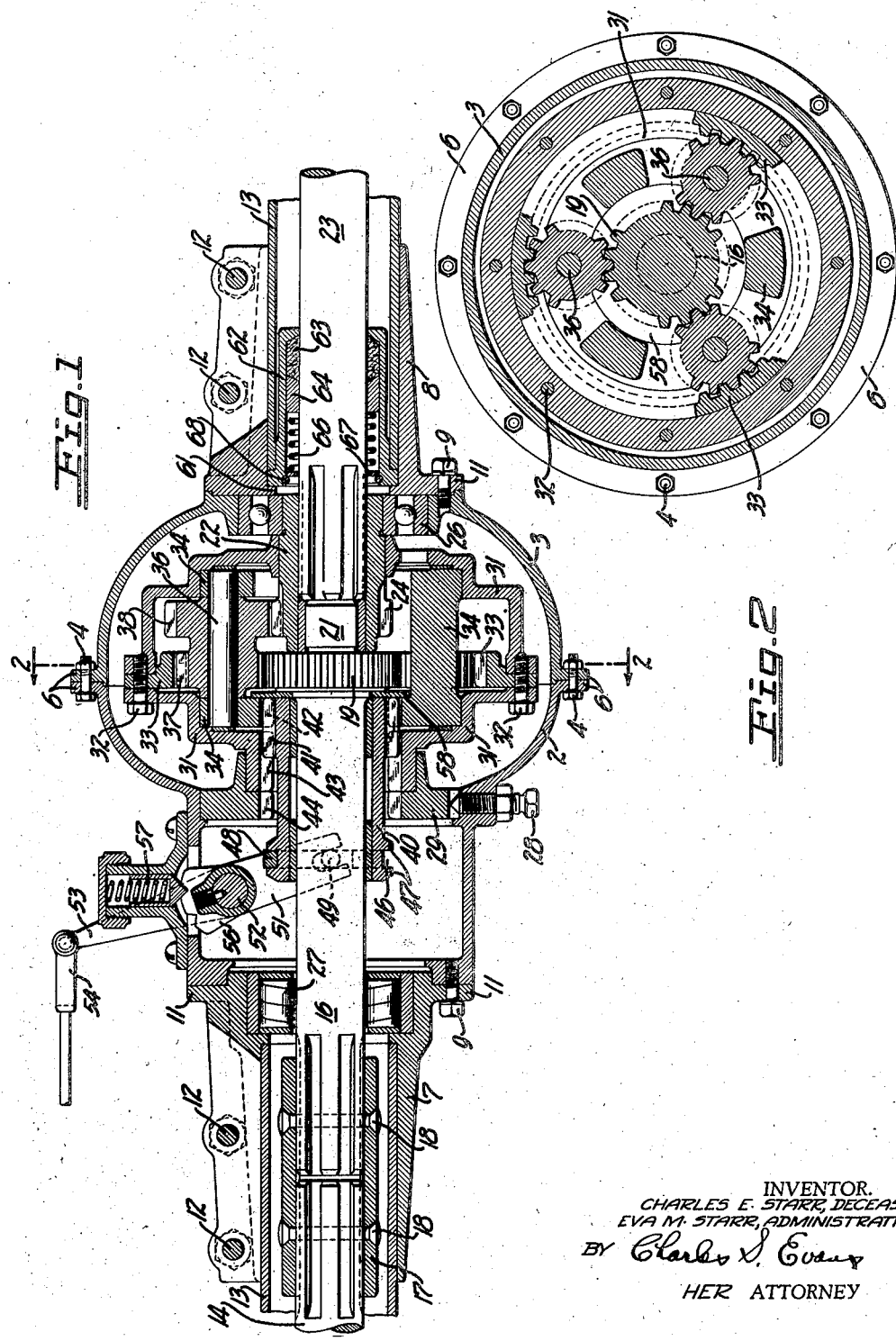
INVENTOR.
CHARLES E. STARR, DECEASED.
EVA M. STARR, ADMINISTRATRIX.
BY Charles S. Evans
HER ATTORNEY Patented Jan. 19, 1937

2,068,437

UNITED STATES PATENT OFFICE 2,068,437

AUXILIARY TRANSMISSION

Charles E. Starr, deceased, late of Inglewood, Calif., by Eva M. Starr, administratrix, Inglewood, Calif., assignor to Perfecto Gear Differential Co., Bellingham, Wash., a corporation of Washington Application March 14, 1935, Serial No. 11,031

6 Claims. (Cl. 74—291)

The invention relates to automobile auxiliary transmission units; and one of the objects of the invention is the provision of such a unit adapted to be interposed in the propeller shaft and torque tube of an automobile for the purpose of giving an additional range of speed changes, and especially for giving an overdrive.

Another object of the invention is the provision of an overdrive transmission in which the main bearings are substantially free of transverse stresses which experience has shown to be particularly destructive in transmissions of this type.

The invention possesses numerous other objects and features of advantage, some of which, with the foregoing, will be set forth in the following description of the invention. It is to be understood that the invention is not limited to this disclosure of species of the invention, as variant embodiments thereof within the scope of the claims may be adopted.

Referring to the drawing:

Figure 1 is a vertical sectional view of the transmission taken in a plane passing through the longitudinal axis of the propeller shaft. At both ends the severed ends of the torque tube are shown within the housing of the transmission.

Figure 2 is a vertical sectional view taken in the plane indicated by the line 2—2 of Figure 1.

In terms of broad inclusion, the transmission of the invention comprises a unit adapted to be inserted into the torque tube and drive shaft of an automobile as commonly constructed; and embodying a planetary gear system interposed between the alined propeller shaft parts. The propeller shaft is thus divided into a driving shaft and a driven shaft; and the planetary system is arranged so as to give an overdrive, or at the option of the driver, lock the shafts together for rotation as one.

The housing of the unit forms a continuation of the torque tube to which it is clamped by suitable means. Journaled within the housing is a hood carrying the ring gear of the planetary system; and journaled within the hood is the planet gear mounting in which double planet gears are arranged for orbital rotation about central gears, one of which is fixed on each of the driving and driven shafts. The gears of the double gear are of different sizes, and are so proportioned, together with the central gears, that when the driving gear is rotating and the ring gear is held, the ratio between driving and driven shaft speeds is about 1 to 1.26. Of course this ratio may be varied to suit varying conditions. The arrangement of the planetary gears and parts is such that transverse stresses on the bearings are either balanced or absent.

This is true because the planet gears roll between the central and ring gears, with the torque transmitted within the gear itself by means of the couple applied by the ring and central gears; instead of rotation upon a fixed axis, upon the bearings of which the thrust would be proportional to the gear sizes.

It is an established fact that the power developed in the automobile engines of the present day is largely in excess of that required for average conditions. This is necessarily so, if sufficient power for quick starting and pulling on adverse grades is provided, and a motor so designed must turn over at an unduly high speed when the automobile is traveling at high speed. It is a broad purpose of this invention to provide an auxiliary transmission of such character that when the car in which it is installed has gained momentum, the speed of the motor can be decreased without reducing the speed of the car, or for the same speed of the motor a higher speed of car may be obtained; and to accomplish this with a mechanism in which destructive stresses do not occur.

In greater detail the transmission unit comprises a closed housing formed of the sections 2 and 3 connected by bolts 4 through abutting flanges 6. Split thimbles 7 and 8 are secured to and alined axially with the housing sections by screws 9 through flanges 11. Bolts 12 are provided in each of the thimbles for clamping them to the severed ends 13 of the torque tube of the vehicle in which the transmission is assembled. It is contemplated that by boring out the thimbles the transmission unit may be fitted in various makes of cars in which the torque tubes differ somewhat in diameter. The propeller shaft 14 is also severed and is connected to the end of the driving shaft 16 of the unit by the splined sleeve 17, additionally held by the rivets 18 passing through both sleeve and shafts.

Fixed on the driving shaft 16 adjacent its inner end is the spur gear 19, which forms the sun gear of the planetary gear system which is used in the transmission. The end of the shaft 16 is extended in the short stub 21 which is journaled in the end of the sleeve 22 splined upon the end of the driven shaft 23 of the transmission unit. The sleeve has integrally formed thereon the spur gear 24 which is the driven gear of the planetary system. Between the sleeve 22 and the housing section 3 is interposed the bearing 26; and the bearing 27 is disposed between the shaft 16 and the thimble 7; these two bearings supporting the alined shafts of the unit.

Extending across the housing, and secured thereon by the screw 28 is the web 29 upon which is journaled one side of the hood 31, the other side of the hood being journaled upon the sleeve 22 adjacent the bearing 26 as shown in Figure 1. The hood is conveniently made in two parts held together by the screws 32, and between the two parts is clamped the internally toothed ring gear 33 of the planetary gear system.

Journaled within the hood on each side thereof is the cage or frame 34 in which the planet pinions of the system are mounted on shafts 36. These pinions, of which three are preferably spaced about the hood, are double gears, the smaller of which, 37, is meshed with the center gear 19 and the ring gear 33. The larger gear 38 of each of the double gears is meshed with the driven gear 24, which of course is smaller than the center gear 19. The proportion of these gears is preferably such as to give an overdrive between the two shafts 16 and 13 in the ratio of 1 to 1.26, although this ratio may be varied as desired by varying the respective diameters of the gears. It will of course be noted that by turning the mechanism end for end, so that the shaft 23 becomes the driving shaft, an under drive or reduction gear instead of an overdrive is obtained.

Means are provided for preventing the hood from turning by locking it to the housing so that when the shaft 16 rotates, the shaft 23 is driven the higher speed; or in the alternative, for locking the hood to the planet pinion mounting, so as to prevent planetary action and cause the entire system to revolve as one. Slidably disposed on the shaft 16 adjacent the center gear 19 is a sleeve 40 having the clutch teeth 41 disposed about one end. These clutch teeth are complementary to and adapted to engage with clutch teeth 42 on the planet gear mounting, clutch teeth 43 on the hood, and clutch teeth 44 on the fixed web 29.

In the position of parts shown in Figure 1 the clutch sleeve is positioned to lock the hood to the planet gear mounting so that the planet gears cannot rotate and the shaft 23 and shaft 16 revolve as one. By moving the sleeve 40 to the left of the position shown, its teeth 41 may be engaged with the teeth 44 of the fixed web, while still retaining their engagement with teeth 43 of the hood. In this position the hood and ring gear are held stationary and rotation of the driving shaft 16 causes planetation of the double gears and rotation of the shaft 23 at increased speed.

Means are provided for shifting the sleeve 40. Formed at the end of the sleeve opposite the teeth 41 is a groove 46 defined by the flanges 47 and which carry the yoke 48 having trunnions 49. The trunnions are engaged by the ends of the shifting fork arms 51 fixed on the shaft 52 pivotally journaled in the housing. The projecting end of the shaft is provided with an arm 53 connected by the link 54 with a suitable operating lever adjacent the hand of the driver. Also fixed integral with the forks 51 is notched segment 56 engaged by the spring pressed pin 57. The notches are so disposed that the spring pressed pin functions to retain the sleeve 40 in the two operative positions explained.

Bearing rings, such for example as ring 58 between the center gear and the planet gear mounting are disposed at desirable points in the mechanism; and a suitable lubricant is introduced into the housing 2—3, from which it finds its way into the hood and to all of the bearing surfaces. Since the torque tubes of most automobiles are pitched downwardly and rearwardly, provision is made at the rear end of the transmission for preventing the lubricant in the housing from escaping into the rear end of the torque tube. Secured between the shoulder 61 and the adjacent end of the torque tube 13 is a packing gland comprising a sleeve 62 in which a packing 63 is resiliently condensed by the collar 64 pressed by the spring 66, interposed between the collar and ring 67 retained in the sleeve by the split ring 68.

In the drawing is shown a split thimble 8 at the right or rear end of the transmission unit which is desirable when the transmission unit is installed in a well known low priced car. On many other cars, it is preferable to omit this thimble and substitute for it a short cylindrical housing which abuts directly against the rear axle housing in the position previously and customarily occupied by a roller bearing housing.

From the above it will be understood that in normal operation of the automobile in which my transmission unit is installed; the clutch sleeve 40 may be allowed to remain in the position illustrated in Figure 1, in which position the auxiliary transmission is ineffective, and the shafts 16 and 23 revolve as one, the standard transmission of the car being used alone. When desired, however, the operating lever for the auxiliary transmission may be moved to shift the clutch sleeve so that the auxiliary transmission is operative, thus giving a higher ratio than normal for each position of the standard transmission shift lever. These added ratios will be found highly convenient in driving a car through traffic, but its particular advantage will be found when the car has been brought up to speed on the open road and it is desired to maintain a relatively high driving speed over a considerable time. Under these conditions an engine speed normally corresponding to a car speed of forty miles an hour will actually give a car speed of about fifty miles per hour. These advantages may be expressed in terms of the saving of wear and fuel.

It will be noted that while operating as an overdrive, the planet gears roll around between the central and ring gears with a motion similar to that of a pencil rolled between the palms of the hands. There is thus but very minor pressure of any kind exerted on the shafts 36 on the frame 34, and no unbalanced transverse stresses are carried by these parts. Herein lies one of the major advantages of the construction devised, since there is no need for bearings capable of carrying the very destructive lateral thrusts of a fixed jack shaft. The result is a mechanism of long life with low friction losses, and a lubrication problem of elementary character, which in turn spells a mechanism giving satisfactory service over a long period with a minimum of adjustments and repairs.

What is claimed is:

1. A transmission comprising a driving and a driven shaft, a gear fixed on each of said shafts, a double gear in mesh with said shaft-fixed gears, a ring gear in mesh with one of the double gears, a housing, a mounting for the ring gear journaled on one of said shafts, a mounting for the double gear journaled in the ring gear mounting, and means for optionally locking the ring gear mounting to the housing or to the double gear mounting.

2. A transmission comprising a driving and a driven shaft, a gear fixed on each of said shafts, a double gear in mesh with said shaft-fixed gears, a ring gear in mesh with one of the double gears, a housing, a mounting for the ring gear journaled on the driven shaft, a mounting for the double gear journaled in the ring gear mounting, and means for optionally locking the ring gear mounting to the housing or to the double gear mounting.

3. A transmission comprising a driving and a driven shaft; a gear fixed on each of said shafts; a double gear in mesh with said shaft-fixed gears; a ring gear in mesh with one of the double gears; a fixed element; a mounting for the ring gear; a mounting for the double gear; a clutch sleeve; clutch elements on the fixed element, ring gear mounting, double gear mounting, and sleeve; and means for optionally shifting the sleeve to engage the ring gear mounting with the fixed element or with the double gear mounting.

4. A transmission comprising a driving and a driven shaft, a gear fixed on each of said shafts, a double gear in mesh with said shaft-fixed gears, a ring gear in mesh with one of the double gears, a housing having clutch elements surrounding one of said shafts, a mounting for the ring gear journaled on one of said shafts and having clutch elements operatively adjacent to the housing elements, a mounting for the double gear journaled in the ring gear mounting and having clutch elements operatively adjacent to the housing elements and the ring gear mounting elements, and a clutch sleeve having clutch elements complementary to the other clutch elements and optionally shiftable to lock the ring gear to the housing or to the double gear mounting.

5. A transmission comprising a driving and a driven shaft, a gear fixed on each of said shafts, a double gear in mesh with said shaft-fixed gears, a ring gear in mesh with one of the double gears, a rotor carrying the ring gear, a mounting for the double gear within the rotor, a fixed element outside the rotor, and a clutch member slidable axially on one of the shafts and extending through one end of the rotor for optionally locking the ring gear to the fixed element or to the double gear mounting.

6. A transmission comprising a pair of shafts, a gear fixed on each shaft, a rotor surrounding the ends of the shafts and enclosing the gears, a ring journaled in each end of the rotor, a double gear meshed with the shaft-fixed gears and journaled at each end in said rings, a ring gear on the rotor and meshed with one of the double gears, a fixed element, and a clutch member rotatable with the rotor and lockable with either the fixed element or one of said double gear supporting rings.

EVA M. STARR,
*Administratrix of the Estate of Charles E. Starr, Deceased.*